United States Patent
Ko et al.

(10) Patent No.: US 9,437,156 B2
(45) Date of Patent: Sep. 6, 2016

(54) ELECTRONIC APPARATUS AND METHOD FOR SWITCHING DISPLAY MODE

(71) Applicants: Cheng-Yi Ko, Taipei (TW); Pie-Jen Lin, Taipei (TW); Yung-Hsiang Chen, Taipei (TW); Hsin Lu, Taipei (TW); Chuan-Hao Wen, Taipei (TW); Chia-An Chen, Taipei (TW); Hong-Tien Wang, Taipei (TW)

(72) Inventors: Cheng-Yi Ko, Taipei (TW); Pie-Jen Lin, Taipei (TW); Yung-Hsiang Chen, Taipei (TW); Hsin Lu, Taipei (TW); Chuan-Hao Wen, Taipei (TW); Chia-An Chen, Taipei (TW); Hong-Tien Wang, Taipei (TW)

(73) Assignee: COMPAL ELECTRONICS, INC., Taipei (TW)

(*) Notice: Subject to any disclaimer, the term of this patent is extended or adjusted under 35 U.S.C. 154(b) by 447 days.

(21) Appl. No.: 13/906,356

(22) Filed: May 31, 2013

(65) Prior Publication Data
US 2013/0321434 A1 Dec. 5, 2013

Related U.S. Application Data

(60) Provisional application No. 61/654,963, filed on Jun. 4, 2012.

(51) Int. Cl.
*G09G 5/00* (2006.01)
*G09G 5/14* (2006.01)
*G06F 3/0488* (2013.01)
*G06F 1/16* (2006.01)

(52) U.S. Cl.
CPC .............. *G09G 5/003* (2013.01); *G06F 1/1616* (2013.01); *G06F 1/1624* (2013.01); *G06F 1/1632* (2013.01); *G06F 1/1637* (2013.01); *G06F 1/1677* (2013.01); *G06F 3/04886* (2013.01); *G09G 5/14* (2013.01); *G09G 2320/0613* (2013.01); *G09G 2320/08* (2013.01); *G09G 2340/0407* (2013.01)

(58) Field of Classification Search
None
See application file for complete search history.

(56) References Cited

U.S. PATENT DOCUMENTS

| | | | |
|---|---|---|---|
| 6,003,052 A * | 12/1999 | Yamagata | 708/100 |
| 7,114,090 B2 * | 9/2006 | Kardach et al. | 713/323 |
| 7,372,445 B2 * | 5/2008 | Takahashi et al. | 345/100 |
| 7,616,197 B1 * | 11/2009 | Gettemy et al. | 345/211 |
| 7,692,667 B2 * | 4/2010 | Nguyen et al. | 345/619 |
| 2010/0273531 A1 * | 10/2010 | Hu | 455/566 |
| 2012/0147297 A1 * | 6/2012 | Kim et al. | 349/86 |
| 2013/0047377 A1 * | 2/2013 | Hsu et al. | 16/273 |
| 2014/0274217 A1 * | 9/2014 | Lee | H04M 1/0266 455/566 |

FOREIGN PATENT DOCUMENTS

| | | |
|---|---|---|
| CN | 1734392 | 2/2006 |
| TW | 200802204 | 1/2008 |
| TW | 201201070 | 1/2012 |

OTHER PUBLICATIONS

"Office Action of Taiwan Counterpart Application", issued on Dec. 24, 2014, p. 1-p. 7.

* cited by examiner

*Primary Examiner* — Edward Martello
(74) *Attorney, Agent, or Firm* — Jianq Chyun IP Office (57) ABSTRACT

An electronic apparatus and a method for switching a display mode are provided. The method includes: turning on the electronic apparatus to enter a full-screen display mode; switching the full-screen display mode to a block display mode when a mode-switching signal is triggered; and enabling a corresponding operation interface in the block display mode according to an execution state of an operation system of the electronic apparatus in the full-screen display mode and displaying the operation interface in the designated block of the display unit.

16 Claims, 7 Drawing Sheets

ELECTRONIC APPARATUS AND METHOD FOR SWITCHING DISPLAY MODE

CROSS-REFERENCE TO RELATED APPLICATION

This application claims the priority benefits of U.S. provisional application Ser. No. 61/654,963, filed on Jun. 4, 2012. The entirety of the above-mentioned patent application is hereby incorporated by reference herein and made a part of this specification.

BACKGROUND

1. Technical Field

The disclosure generally relates to a display method, and more particularly, to an electronic apparatus and a method for switching a display mode.

2. Description of Related Art

In the present era of information explosion, electronic products have inseparable relationship with our daily lives. Many electronic apparatuses such as desktop personal computer (PC), notebook computer, tablet computer and smart phone are everywhere around our lives. With the continue evolving of the electronic technology, user-friendly and good-functional electronic devices have been updated and innovated year by year, so that the electronic apparatuses have gradually become an indispensable tool of everyday life. In order to meet the increasingly diversified needs of consumers, the function types and their quantities which various electronic apparatuses can support also surge therewith. Therefore, how to enhance the functionality of an electronic apparatus still remains an important part of the present technology development.

SUMMARY

Accordingly, the disclosure is directed to an electronic apparatus and a method for switching a display mode which are able to enhance the functionality of an electronic apparatus by switching the displaying frames of a display unit and increase the usage convenience.

The electronic apparatus of the disclosure includes a display unit, a switching unit and a processing unit. The display unit has a full-screen display mode and a block display mode, in which in the full-screen display mode, the whole display unit serves as a displaying frame; in the block display mode, a designated block on the display unit serves as the displaying frame. The switching unit is coupled to the display unit for switching the full-screen display mode to the block display mode according to a mode-switching signal. The processing unit is coupled to the display unit, in which upon receiving the mode-switching signal, the processing unit enables an operation interface corresponding to an execution state of an operation system of the electronic apparatus in the full-screen display mode and displays the operation interface in the designated block.

In an embodiment of the disclosure, the electronic apparatus includes a first body and a second body. The first body includes the display unit. The second body is pivoted to the first body and includes the processing unit and the switching unit. When the second body is parallel to the display unit side of the first body to present a folded state, the second body covers the display unit.

In an embodiment of the disclosure, the second body further includes a sensing element and a judging unit. The sensing element is configured for detecting a relative movement between the second body and the first body. The judging unit is coupled to the sensing element and the processing unit, in which when the sensing element detects the relative movement is to expose only the designated block of the display unit, the mode-switching signal is triggered. And the relative movement is, for example, a relative sliding between the second body and the first body. In addition, the relative position between the second body and the first body can be detected by using the sensing element so that the judging unit can decide whether or not to trigger the mode-switching signal base on the relative position.

In an embodiment of the disclosure, the second body further includes a mode-triggering unit coupled to the processing unit, in which when the mode-triggering unit is enabled, the mode-switching signal is triggered. When the first body and the second body are in the folded state, as the processing unit receives the mode-switching signal, the processing unit controls the second body to move relatively to the first body so as to expose only the designated block of the display unit.

In an embodiment of the disclosure, the mode-triggering unit is, for example, a button.

In an embodiment of the disclosure, the electronic apparatus further includes a cradle. When the first body and the second body are in the folded state, the cradle can carry the first body and the second body. When the first body and the second body are placed on the cradle, the mode-triggering unit is enabled to trigger the mode-switching signal.

In an embodiment of the disclosure, in the electronic apparatus, when the first body and the second body are in the folded state, the electronic apparatus enters a hibernation state. When the mode-switching signal is triggered, the mode-switching signal awakes the electronic apparatus. In addition, before the electronic apparatus enters the hibernation state, the processing unit can further record the execution state of the operation system in the full-screen display mode.

In an embodiment of the disclosure, the execution state is, for example, a desktop display state, a music playing state or an email browsing state.

The disclosure also provides a method for switching a display mode, for an electronic apparatus with a display unit. The method includes: turning on the electronic apparatus to enter a full-screen display mode, in which in the full-screen display mode, the whole display unit serves as a displaying frame; switching the full-screen display mode to a block display mode when a mode-switching signal is triggered, in which in the block display mode, a designated block in the display unit serves as the displaying frame; and in the block display mode, enabling an operation interface corresponding to an execution state of an operation system of the electronic apparatus in the full-screen display mode and displaying the operation interface in the designated block.

In an embodiment of the disclosure, after the step of turning on the electronic apparatus to enter the full-screen display mode, the electronic apparatus enters a hibernation state when a first body and a second body of the electronic apparatus with the display unit are in a folded state, in which the folded state is corresponding to that the second body is parallel to the display unit side of the first body and the second body covers the display unit, and thereafter, the electronic apparatus is awoken as the mode-switching signal is triggered.

In an embodiment of the disclosure, before the step of making the electronic apparatus enter the hibernation state, the method further includes recording the execution state of the operation system in the full-screen display mode.

In an embodiment of the disclosure, when the first body and the second body are in the folded state, the method further includes detecting a relative movement between the second body and the first body; and triggering the mode-switching signal when it is detected that the relative movement is to expose only the designated block of the display unit. The relative movement is a relative sliding between the second body and the first body.

In an embodiment of the disclosure, when the first body and the second body are in the folded state, the method further includes: detecting a relative position between the second body and the first body so as to decide whether or not to trigger the mode-switching signal base on the relative position.

In an embodiment of the disclosure, when the first body and the second body are in the folded state, the method further includes: controlling the second body to move relatively to the first body to expose only the designated block of the display unit when the mode-switching signal is triggered.

In an embodiment of the disclosure, when the first body and the second body are in the folded state, the method further includes: triggering the mode-switching signal when a button of the electronic apparatus is enabled and making the second body move relatively to the first body to expose only the designated block of the display unit.

In an embodiment of the disclosure, when the first body and the second body are in the folded state, the method further includes: triggering the mode-switching signal when the electronic apparatus is placed on a cradle.

Based on the depiction above, the display unit is switched to the block display mode according to the mode-switching signal and the operation interface displayed in the block display mode corresponds to the execution state in the full-screen display mode. In this way, the disclosure can enhance the functionality of the electronic apparatus and increase the usage convenience.

Other objectives, features and advantages of the present disclosure will be further understood from the further technological features disclosed by the embodiments of the present disclosure wherein there are shown and described preferred embodiments of this disclosure, simply by way of illustration of modes best suited to carry out the disclosure.

DESCRIPTION OF THE EMBODIMENTS

The First Embodiment

Figure 1:
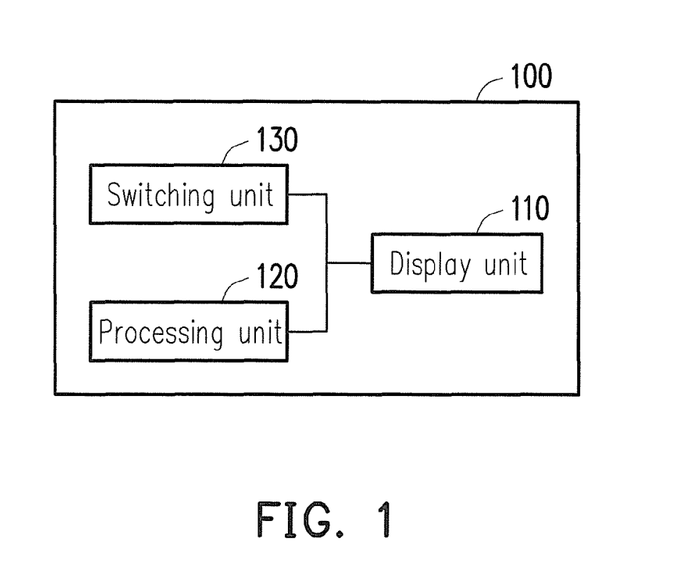
FIG. 1 is a block diagram of an electronic apparatus according to the first embodiment of the disclosure.

FIG. 1 is a block diagram of an electronic apparatus according to the first embodiment of the disclosure. Referring to FIG. 1, an electronic apparatus 100 includes a display unit 110, a processing unit 120 and a switching unit 130. The processing unit 120 and the switching unit 130 herein are both coupled to the display unit 110.

The display unit 110 has a full-screen display mode and a block display mode. In the full-screen display mode, the whole display unit 110 (i.e., the full screen) serves as the displaying frame; in the block display mode, a designated block on the display unit 110 serves as the displaying frame. The designated block is just a portion of the display unit 110. That is, the size of the displaying frame in the block display mode is smaller than the displaying frame in the full-screen display mode.

As the processing unit 120 receives a mode-switching signal, an operation interface corresponding to the execution state of the operation system of the electronic apparatus 100 in the full-screen display mode is enabled and the operation interface is displayed in the designated block. The switching unit 130 switches the display unit 110 from the full-screen display mode to the block display mode according to the mode-switching signal.

The processing unit 120 is, for example, a central processing unit (CPU), a microprocessor or an embedded control chip. The switching unit 130 is, for example, a chip composed of one or multiple digital logic gates. In other embodiments, the switching unit 130 can also be integrated into the processing unit 120; or the function of the switching unit 130 can be realized through software.

Figure 2:
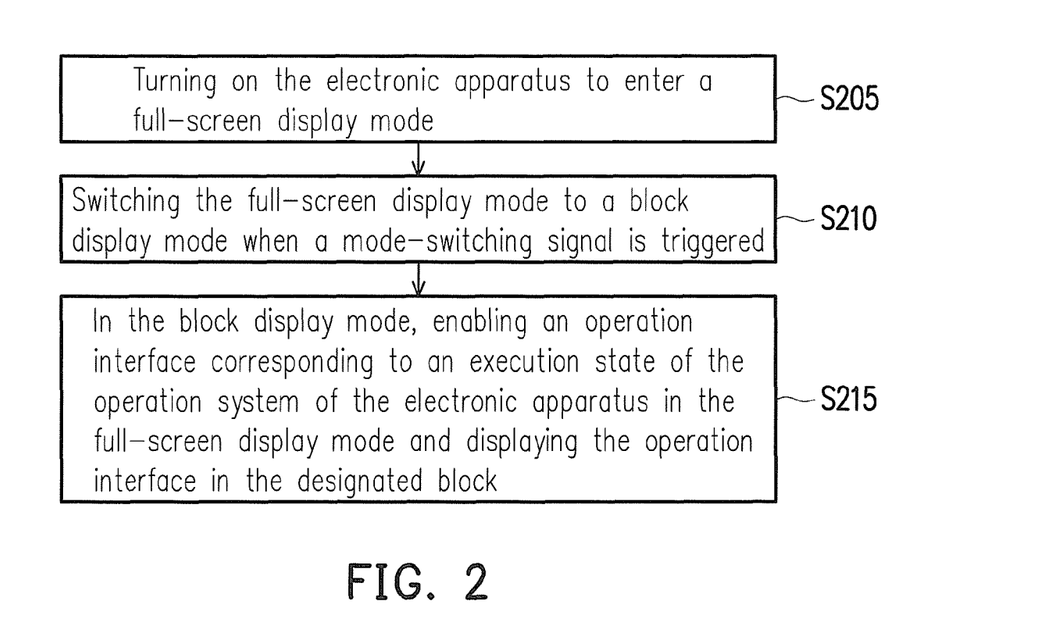
FIG. 2 is a flowchart of a method for switching a display mode according to the first embodiment of the disclosure.

The steps for switching a display mode are explained through the electronic apparatus 100 in the followings. FIG. 2 is a flowchart of a method for switching a display mode according to the first embodiment of the disclosure. Referring to FIGS. 1 and 2, the method of the embodiment is applied in the electronic apparatus 100 with the display unit 110.

First, in step S205, the electronic apparatus 100 is turned on so as to enter the full-screen display mode, i.e., after turning on the electronic apparatus 100, the display unit 110 enters the full-screen display mode. At the time, the whole display unit 110 (full screen) serves as the displaying frame for operation.

Next, in step S210, as the electronic apparatus 100 receives the mode-switching signal, the switching unit 130 switches the display unit 110 from the full-screen display mode to the block display mode. In the block display mode, only a designated block on the display unit 110, other than the whole display unit 110, serves as the displaying frame. The size and the scope of the designated block can be preset in the electronic apparatus 100, or set by the user.

Then, in step S215, in the block display mode, the processing unit 120 enables an operation interface corresponding to the execution state of the operation system of the electronic apparatus 100 in the full-screen display mode and displays the above-mentioned operation interface in the designated block. For example, the processing unit 120 would record the execution state of the operation system in the full-screen display mode (for example, an executing application, etc.). After switching the mode to the block display mode, the processing unit 120 enables the corresponding operation interface according to the above-mentioned execution state so as to display the operation interface in the designated block. The above-mentioned execution state is such as a desktop display state, a music playing state or an email browsing state, etc.

For example, the operation interface to be used in the designated block can be set in advance in the electronic apparatus 100 according to different execution states. Assuming three execution states of the desktop display state, the music play state and the email browsing state are defined in the electronic apparatus 100, in which the desktop display state means the displaying frame is the desktop without displaying the interfaces of other applications; the music playing state means the displaying frame is the interface of a music player; the email browsing state means the displaying frame is the interface of email boxes. In this way, a simple desktop interface, a simple music player interface and a simple email interface are correspondingly set in the electronic apparatus 100 in advance according to the above-mentioned execution states and the interfaces are available to be used in the block display mode. That is, an execution state is corresponding to an operation interface used in the designated block. It should be noted that the above-mentioned execution states and the operation interfaces are for illustration purpose only, which the disclosure is not limited to and the real operation interfaces can be set according to demands.

Figure 3A:
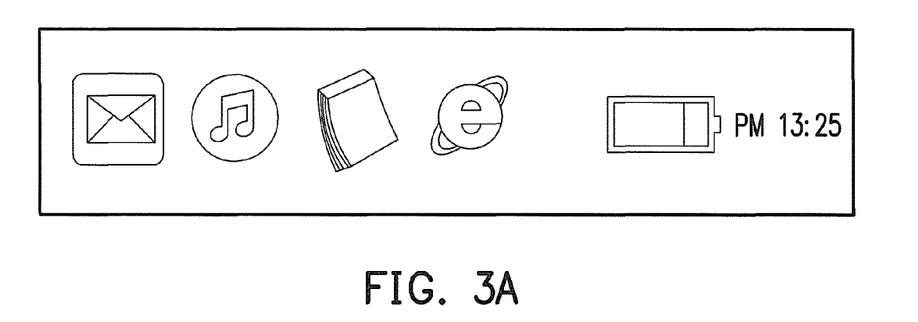
FIGS. 3A-3C are schematic diagrams of three operation interfaces according to the first embodiment of the disclosure.
Figure 3B:
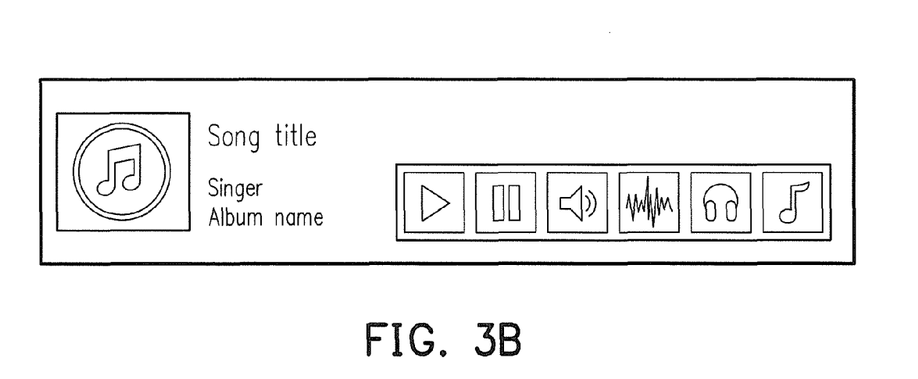
Figure 3C:
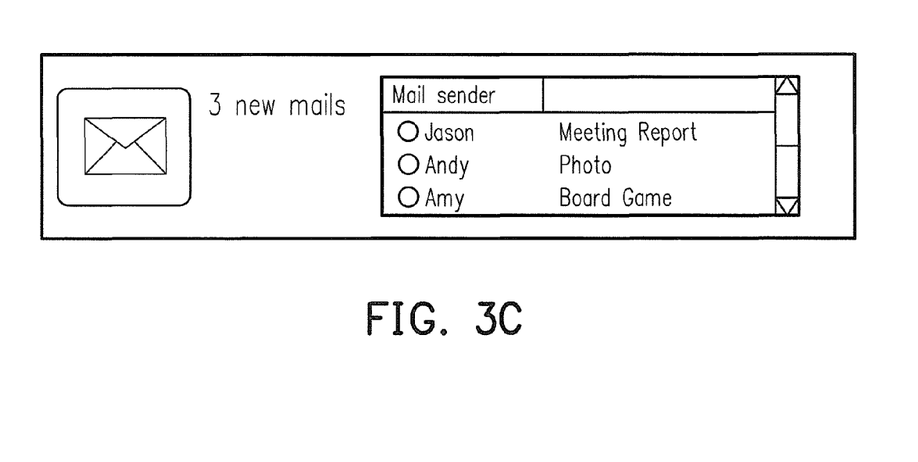

For example, FIGS. 3A-3C are schematic diagrams of three operation interfaces according to the first embodiment of the disclosure, in which FIG. 3A represents a simple desktop interface, FIG. 3B represents a simple music player interface and FIG. 3C represents a simple email interface.

As the processing unit 120 receives the mode-switching signal, it enables a corresponding operation interface according to the execution state in the full-screen display mode. For example, when the execution state in the full-screen display mode is the desktop display state and the display mode is switched to the block display mode, the simple desktop interface (as shown in FIG. 3A) is enabled to be displayed in the designated block.

The above-mentioned electronic apparatus 100 can be implemented with a clamshell electronic apparatus, and the function of the electronic apparatus 100 and the method for switching a display mode can be implemented by using different parts, referring to the following embodiment, wherein the component notations of the parts hereinafter provided in the following embodiment are the same as or similar to the first embodiment, while the repeated same details are omitted.

The Second Embodiment

Figure 4:
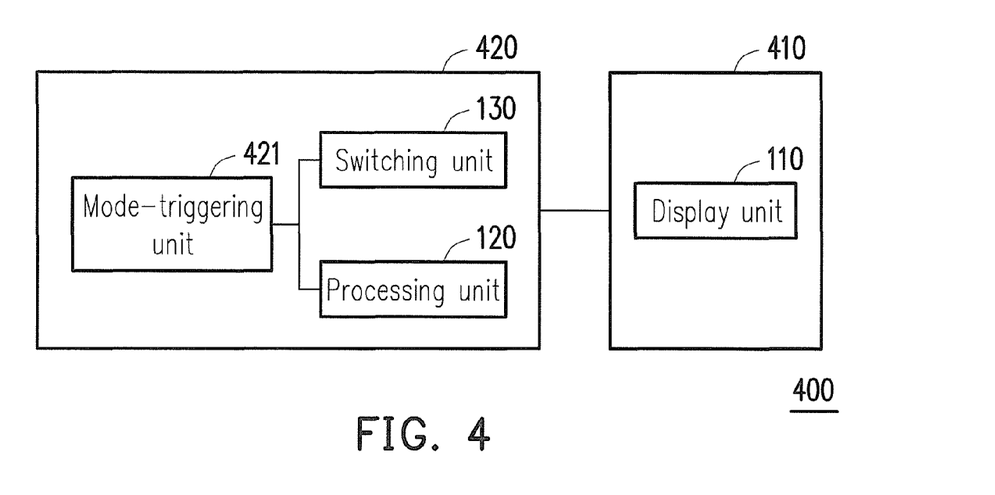
FIG. 4 is a block diagram of an electronic apparatus according to the second embodiment of the disclosure.

FIG. 4 is a block diagram of an electronic apparatus according to the second embodiment of the disclosure. The second embodiment, in fact, is an application of the first embodiment. Referring to FIG. 4, an electronic apparatus 400 includes a first body 410 and a second body 420. The first body 410 is pivoted to the second body 420 through pivoting components (not shown), and the first body 410 and the second body 420 can be in an unfolded state or a folded state through the pivoting components. When the second body 420 is rotated to be parallel to a side of the first body 410 where the display unit 110 is located, the first body 410 and the second body 420 are in the folded state, and in the folded state, the second body 420 covers the display unit 110.

The first body 410 has the display unit 110 disposed therein. The second body 420 has the processing unit 120 and the switching unit 130 disposed therein, and the second body 420 further includes a mode-triggering unit 421. The mode-triggering unit 421 is coupled to the processing unit 120 and the switching unit 130. When the mode-triggering unit 421 is enabled, the mode-switching signal is transmitted to the processing unit 120. In other embodiments, if the switching unit 130 is integrated into the processing unit 120, the mode-triggering unit 421 is coupled to the processing unit 120.

In the embodiment, when the second body 420 covers the display unit 110 (i.e., the first body 410 and the second body 420 are in the folded state), as the processing unit 120 receives the mode-switching signal, the processing unit 120 further controls the second body 420 to move relatively to the first body 410 so as to expose the designated block of the display unit 110. For example, two corresponding moving mechanisms (not shown) are respectively disposed at the first body 410 and the second body 420. The second body 420 can move relatively to the first body 410 through the moving mechanisms. In addition, the electronic apparatus 400 can be set to execute the following actions: when the first body 410 and the second body 420 are in the folded state, the electronic apparatus 400 enters a hibernation state; when the mode-switching signal is triggered, the mode-switching signal is used to awake the electronic apparatus 400.

Figure 5:
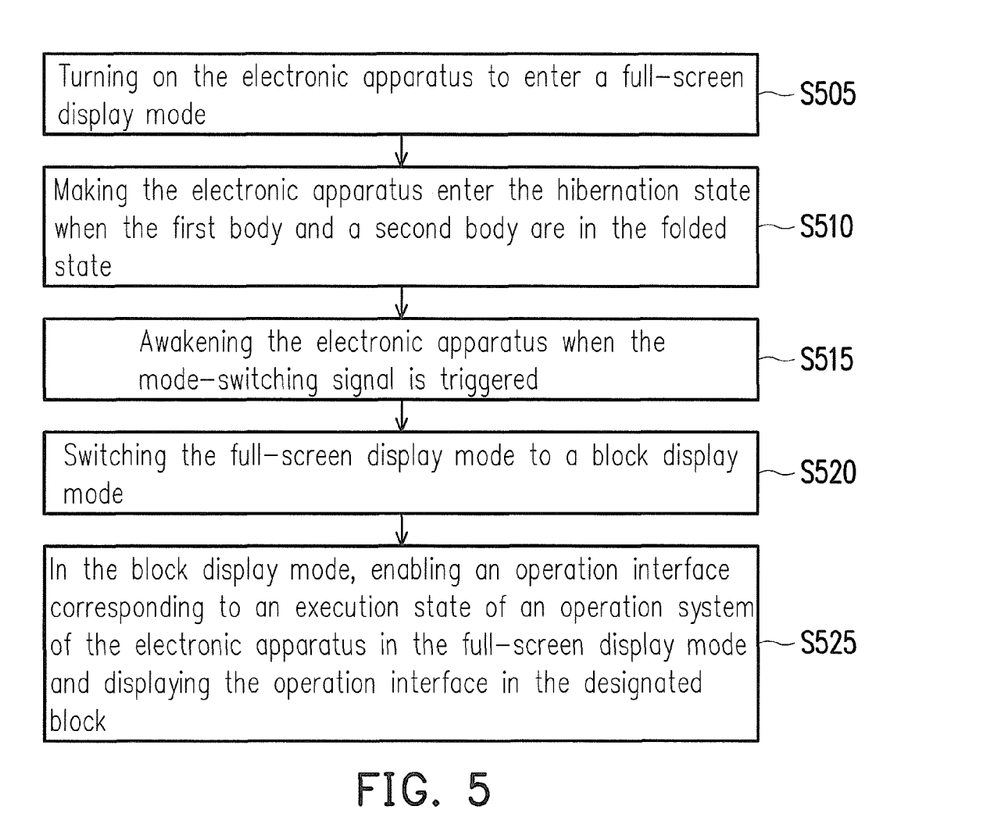
FIG. 5 is a flowchart of a method for switching a display mode according to the second embodiment of the disclosure.

FIG. 5 is a flowchart of a method for switching a display mode according to the second embodiment of the disclosure. Referring to FIGS. 4 and 5, in step S505, when the first body 410 and the second body 420 are in the unfolded state (i.e., the display unit 110 is not covered by the second body 420), the electronic apparatus 400 is turned on and enters the full-screen display mode. In other words, when the electronic apparatus 110 is turned on at the unfolded state, the display unit 110 is in the full-screen display mode in which the whole display unit 110 (the full screen) serves as the displaying frame for user operation.

In step S510, when the first body 410 and the second body 420 are in the folded state, the electronic apparatus 400 enters the hibernation state. That is, when the first body 410 rotates to be parallel to the second body 420 so that the display unit 110 is covered by the second body 420, the electronic apparatus 400 will enter the hibernation state.

After the electronic apparatus 400 enters the hibernation state, when the mode-switching signal is triggered, the electronic apparatus 400 is awoken and is able to execute the successive operation (step S515). For example, an awaking interrupting signal is generated when the mode-switching signal is triggered so as to awake the electronic apparatus 400.

Further in step S520, the switching unit 130 switches the display unit 110 from the full-screen display mode to the block display mode. Thereafter in step S525, the processing unit 120 in the block display mode enables an operation interface corresponding to the execution state of the operation system of the electronic apparatus 400 in the full-screen display mode and displays the operation interface in the designated block. The details of steps S520 and S525 can refer to the depictions of steps S210 and S215 in the first embodiment.

Figure 6:
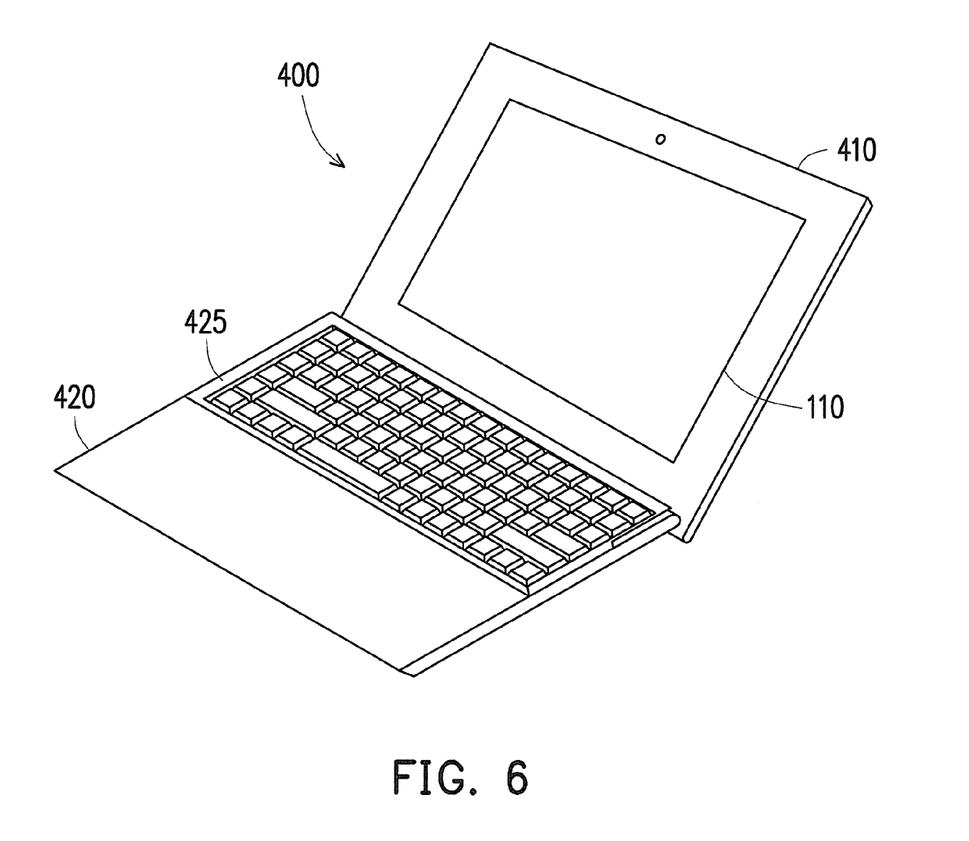
FIG. 6 is an schematic diagram of the electronic apparatus according to the second embodiment of the disclosure.

In the embodiment, the electronic apparatus 400 is, for example, a notebook computer. FIG. 6 is a schematic diagram of the electronic apparatus according to the second embodiment of the disclosure. In FIG. 6, the first body 410 and the second body 420 are in the unfolded state, the display unit 110 is disposed at a side of the first body 410 and a keyboard 425 is disposed in the second body 420 at a side thereof opposite to the display unit 110.

Figure 7A:
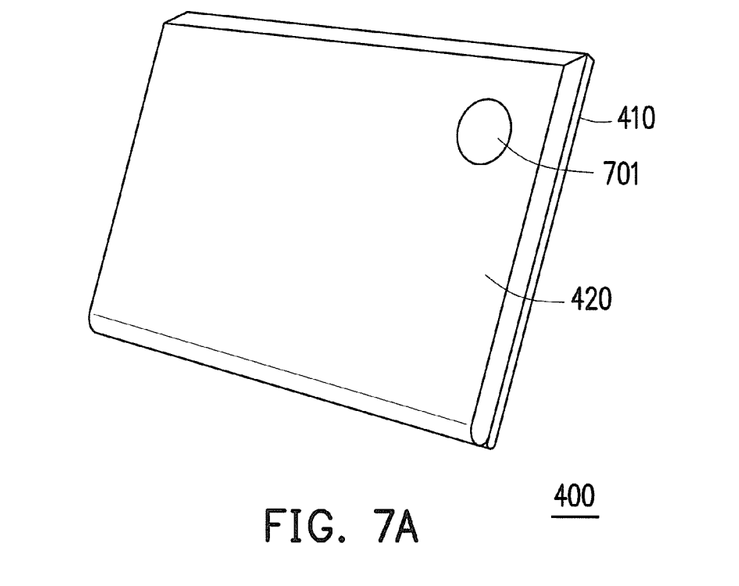
FIGS. 7A and 7B are diagrams where a mode-switching unit is embodied by a button according to the second embodiment of the disclosure.
Figure 7B:
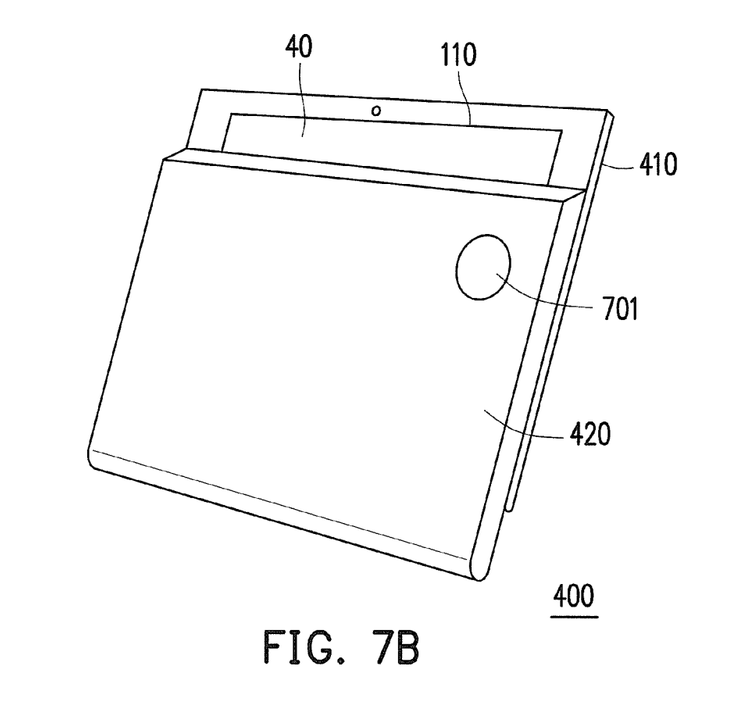
Figure 8A:
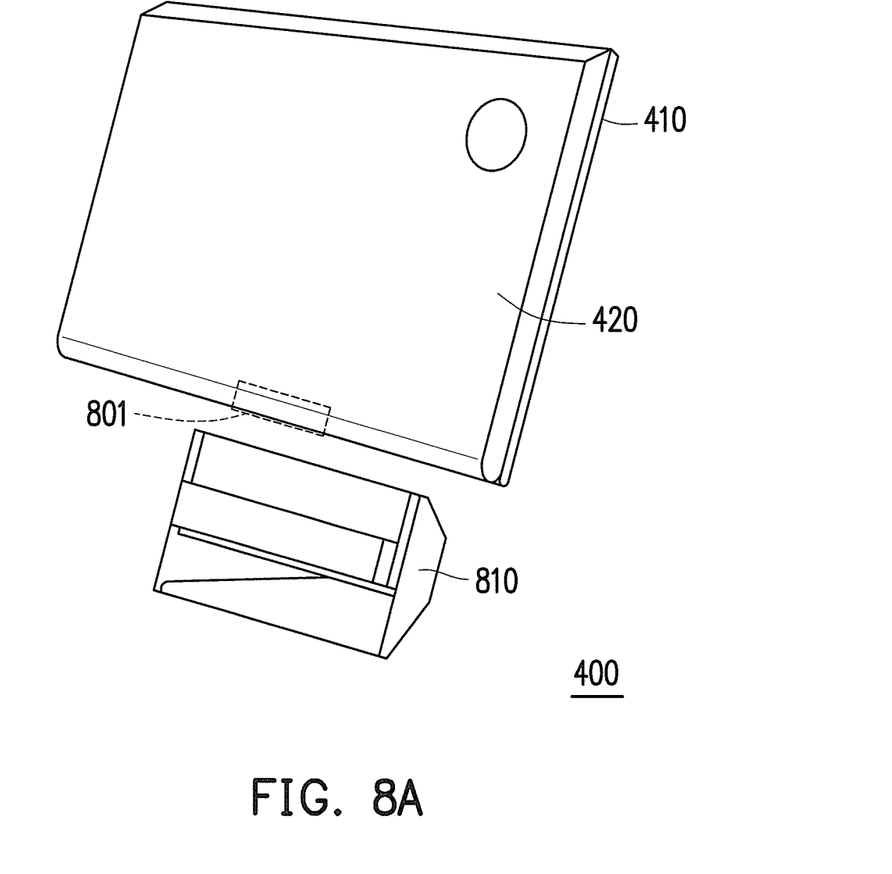
FIGS. 8A and 8B are diagrams where a mode-switching unit is embodied by a connection part according to the second embodiment of the disclosure.
Figure 8B:
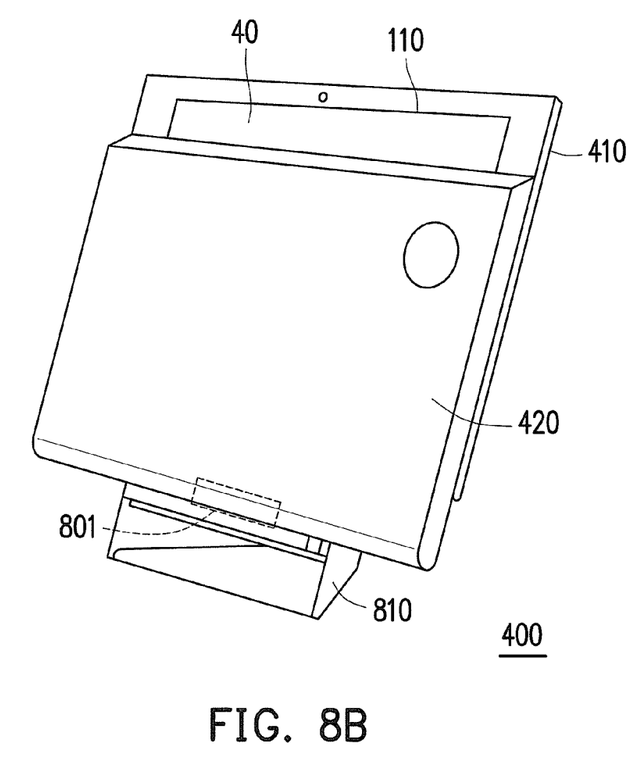

The above-mentioned mode-triggering unit 421 can be implemented with a button; in this case, the above-mentioned mode-switching signal would be triggered by, for example, pressing down the button. The above-mentioned mode-triggering unit 421 can be also implemented with a connecting part. For example, when the first body 410 and the second body 420 in the folded state are placed on a cradle, the connecting part would be enabled to trigger the above-mentioned mode-switching signal. In the following, two examples are explained. FIGS. 7A and 7B are diagrams where a mode-switching unit is embodied by a button according to the second embodiment of the disclosure, while FIGS. 8A and 8B are diagrams where a mode-switching unit is embodied by a connecting part according to the second embodiment of the disclosure.

In FIGS. 7A and 7B, a button 701 is used to implement the mode-triggering unit 421. As shown, the button 701 is disposed in the second body 420 at a side thereof opposite to a keyboard 425. FIG. 7A illustrates the first body 410 and the second body 420 are in the folded state and the button 701 is not yet enabled (i.e., not pressed down yet); FIG. 7B illustrates the button 701 is enabled, and the second body 420 moves relatively to the first body 410 to expose a portion of the display unit 110, ie., to expose the designated block 40 in the display unit 110.

When the first body 410 and the second body 420 are in the unfolded state (as shown in FIG. 6), the electronic apparatus 400 is in the full-screen display mode; when the first body 410 and the second body 420 are in the folded state (as shown in FIG. 7A), the electronic apparatus 400 enters the hibernation state. After the button 701 is enabled, the mode-switching signal is triggered to awake the electronic apparatus 400. At the time, the electronic apparatus 400 executes the following actions: the second body 420 moves relatively to the first body 410 to expose the designated block 40 in the display unit 110 (as shown in FIG. 7B) and the full-screen display mode is switched to the block display mode. Further, a corresponding operation interface is displayed in the designated block 40 according to the execution state in the full-screen display mode. The relative movement of the second body 420 and the first body 410 is, for example, a relative sliding, as shown in FIG. 7B, and at the time, the second body 420 slides downwards to expose only the designated block 40.

In following, the operation interfaces are described by some examples. When the execution state in the full-screen display mode is a desktop display state, the operation interface displayed in the designated block 40 is a simple desktop interface as shown by FIG. 3A; when the execution state in the full-screen display mode is a music playing state, the operation interface displayed in the designated block 40 is a simple music player interface as shown by FIG. 3B; when the execution state in the full-screen display mode is an email browsing state, the operation interface displayed in the designated block 40 is a simple email interface as shown by FIG. 3C. The above-mentioned interfaces are examples only, which the disclosure is not limited to.

In other embodiments, the button 701 can be used to switch the display mode of the display unit 110 by design. For instance, the user can manually (or through an additionally disposed triggering part) move the second body 420 relatively to the first body 410 to expose only a portion of the display unit 110, but only when the button 701 is enabled that the display unit 110 switches to the block display mode and a corresponding operation interface is displayed in the designated block 40.

In FIGS. 8A and 8B, the connecting part 801 is used to implement the mode-triggering unit 421. In the case, the electronic apparatus 400 further includes a cradle 810, while the connecting part 801 is disposed in the second body 420 at a place opposite to the cradle 810. In FIG. 8A, the first body 410 and the second body 420 are in the folded state and will be placed on the cradle 810; in FIG. 8B, after the first body 410 and the second body 420 are placed on the cradle 810, the connecting part 801 is enabled to trigger the mode-switching signal. At the time, the second body 420 moves relatively to the first body 410 (for example, making a relative sliding) to expose only the designated block 40 of the display unit 110.

After the mode-switching signal is triggered to expose only the designated block 40 of the display unit 110, in addition to switching the display mode of the display unit 110 from the full-screen display mode to the block display mode, the processing unit 120 further displays a corresponding operation interface in the designated block 40 according to the execution state in the full-screen display mode.

In addition, a button and a control unit (not shown) can be disposed on the cradle 810. When the button on the cradle 810 is pressed down, the control unit transmits the mode-switching signal to the second body 420 for switching the display mode of the display unit 110.

The Third Embodiment

Figure 9:
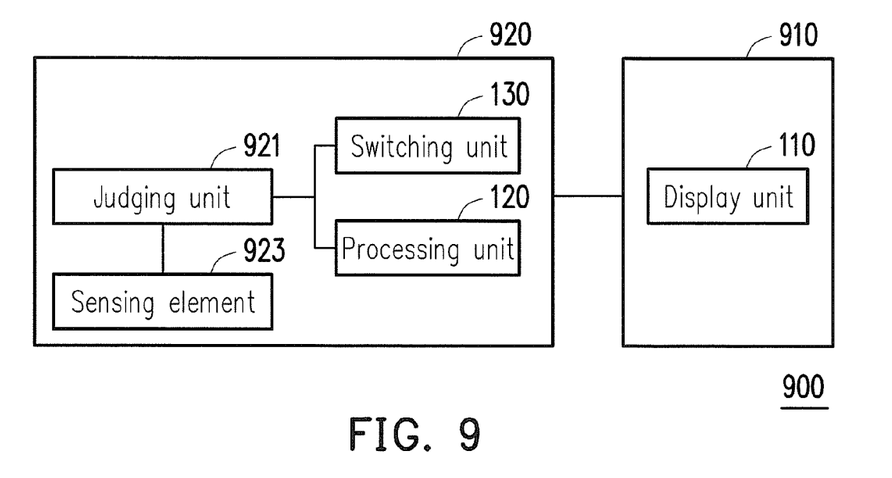
FIG. 9 is a block diagram of an electronic apparatus according to the third embodiment of the disclosure.

FIG. 9 is a block diagram of an electronic apparatus according to the third embodiment of the disclosure. The third embodiment, in fact, is another application of the first embodiment. The difference of the third embodiment from the second embodiment rests in the triggering way of the mode-switching signal.

Referring to FIG. 9, an electronic apparatus 900 includes a first body 910 and a second body 920. The first body 910 is pivoted to the second body 920 through a pivoting component (not shown). The first body 910 and the second body 920 can be in the unfolded state or the folded state through the pivoting component. When the second body 920 swings to be parallel to a side of the first body 910 where the display unit 110 is located (the display unit side of the first body 910), the first body 910 and the second body 920 are in the folded state, and in the folded state, the second body 920 covers the display unit 110.

The display unit 110 is disposed at the first body 910, and the processing unit 120 and the switching unit 130 are disposed at the second body 920. The second body 920 further includes a judging unit 921 and a sensing element 923. The sensing element 923 herein is, for example, a lid switch, a light sensor or a camera for detecting a relative movement between the second body 920 and the first body 910, i.e., whether or not the second body 920 has moved relatively to the first body 910.

The judging unit 921 is coupled to the sensing element 923, the processing unit 120 and the switching unit 130. When it is detected that the second body 920 has moved relatively to the first body 910 and only the designated block 40 of the display unit 110 is exposed, the mode-switching signal is triggered. That is, in the embodiment, whether or not the mode-switching signal is triggered is decided according to the moving of the second body 920 relatively to the first body 910. For example, after detecting that the second body 920 has moved relatively to the first body 910 to expose only the designated block, the displaying frame is switched to the block display mode. The steps for switching the displaying frame in the third embodiment can refer to the depictions of FIG. 2 or FIG. 5, which is omitted to describe.

In addition, the sensing element 923 can be used to detect the relative position between the second body 920 and the first body 910 so that the judging unit 921 can decide whether or not to trigger the mode-switching signal base on the relative position.

In summary, in the above-mentioned embodiments, the display unit is switched to the block display mode according to the mode-switching signal, and the operation interface displayed in the block display mode corresponds to the execution state in the full-screen display mode. In addition, the mode-switching signal may be triggered according to the relative movement of the first body and the second body or the placing of the first body and the second body on the cradle. In this way, the disclosure can enhance the functionality of the electronic apparatus, increase the usage convenience and further make the using way of the electronic apparatus more diversity.

It will be apparent to those skilled in the art that the descriptions above are several preferred embodiments of the disclosure only, which does not limit the implementing range of the disclosure. Various modifications and variations can be made to the structure of the disclosure without departing from the scope or spirit of the disclosure. The claim scope of the disclosure is defined by the claims hereinafter.

What is claimed is:

1. An electronic apparatus, comprising:
a display unit, having a full-screen display mode and a block display mode, wherein in the full-screen display mode, the whole display unit serves as a displaying frame; in the block display mode, a designated block on the display unit serves as the displaying frame;
a switching unit, coupled to the display unit and switching the full-screen display mode to the block display mode according to a mode-switching signal; and
a processing unit, coupled to the display unit, wherein upon receiving the mode-switching signal, the processing unit enables a corresponding operation interface according to an execution state of an operation system of the electronic apparatus in the full-screen display mode and displays the operation interface in the designated block,
wherein the execution state in the full-screen display mode is an application executing in the full-screen display mode, the operation interface displayed in the designated block corresponds to the application executing in the full-screen display mode, the operation interface is different from an interface of the application executing in the full-screen display mode, a size of the operation interface matches a size of the designated block, the operation interface provides a simple operation function corresponding to the application executing in the full-screen display mode, and the simple operation function is a part of functions provided by the application executing in the full-screen mode.

2. The electronic apparatus as claimed in claim 1, comprising:
a first body, comprising the display unit; and
a second body, pivoted to the first body and comprising the processing unit and the switching unit;
wherein when the second body is parallel to the display unit side of the first body to present a folded state, the second body covers the display unit.

3. The electronic apparatus as claimed in claim 2, wherein the second body further comprises:
a sensing element, configured for detecting a relative movement between the second body and the first body; and a judging unit, coupled to the sensing element and the processing unit, wherein when the relative movement is to expose only the designated block of the display unit, the judging unit triggers the mode-switching signal.

4. The electronic apparatus as claimed in claim 3, wherein the sensing element detects a relative position between the second body and the first body, and based on the relative position, the judging unit decides whether to trigger the mode-switching signal.

5. The electronic apparatus as claimed in claim 3, wherein the relative movement is a relative sliding between the second body and the first body.

6. The electronic apparatus as claimed in claim 1, further comprising:
a cradle, configured to carry the first body and the second body when the first body and the second body are in the folded state;
wherein placing the first body and the second body on the cradle triggers the mode-switching signal.

7. The electronic apparatus as claimed in claim 2, wherein when the first body and the second body are in the folded state, the electronic apparatus enters a hibernation state;
wherein when the mode-switching signal is triggered, the electronic apparatus is awaked by the mode-switching signal.

8. The electronic apparatus as claimed in claim 7, wherein before the electronic apparatus enters the hibernation state, the processing unit records the execution state of the operation system in the full-screen display mode.

9. The electronic apparatus as claimed in claim 1, wherein the execution state of the operation system comprises one of a desktop display state, a music playing state and an email browsing state.

10. A method for switching a display mode, for an electronic apparatus with a display unit; the method comprising:
turning on the electronic apparatus to enter a full-screen display mode, wherein in the full-screen display mode, the whole display unit serves as a displaying frame;
switching the full-screen display mode to a block display mode when a mode-switching signal is triggered, wherein in the block display mode, a designated block on the display unit serves as the displaying frame; and
in the block display mode, enabling a corresponding operation interface according to an execution state of an operation system of the electronic apparatus in the full-screen display mode and displaying the operation interface in the designated block,
wherein the execution state in the full-screen display mode is an application executing in the full-screen display mode, the operation interface displayed in the designated block corresponds to the application executing in the full-screen display mode, the operation interface is different from an interface of the application executing in the full-screen display mode, a size of the operation interface matches a size of the designated block, the operation interface provides a simple operation function corresponding to the application executing in the full-screen display mode, and the simple operation function is a part of functions provided by the application executing in the full-screen mode.

11. The method as claimed in claim 10, wherein after the step of turning on the electronic apparatus to enter the full-screen display mode, the method further comprises:
making the electronic apparatus enter a hibernation state when a first body with the display unit and a second body are in a folded state, wherein the electronic apparatus has the first body and the second body, and the folded state is corresponding to that the second body is parallel to the display unit side of the first body and the second body covers the display unit; and awakening the electronic apparatus when the mode-switching signal is triggered.

12. The method as claimed in claim 11, further comprising:

recording the execution state of the operation system in the full-screen display mode before the step of making he electronic apparatus enter the hibernation state.

13. The method as claimed in claim 11, wherein when the first body and the second body are in the folded state, the method further comprises:

detecting a relative movement between the second body and the first body; and triggering the mode-switching signal when the relative movement is to expose only the designated block of the display unit.

14. The method as claimed in claim 13, wherein the relative movement is a relative sliding between the second body and the first body.

15. The method as claimed in claim 11, wherein when the first body and the second body are in the folded state, the method further comprises:

detecting a relative position between the second body and the first body; and deciding whether to trigger the mode-switching signal based on the relative position.

16. The method as claimed in claim 11, wherein when the first body and the second body are in the folded state, the method further comprises:

triggering the mode-switching signal when the electronic apparatus is placed on a cradle.

* * * * *